US011423330B2

(12) United States Patent
McCourt, Jr.

(10) Patent No.: US 11,423,330 B2
(45) Date of Patent: Aug. 23, 2022

(54) PERFORMANCE SCORE DETERMINER FOR BINARY SIGNAL CLASSIFIERS

(71) Applicant: Invoca, Inc., Santa Barbara, CA (US)

(72) Inventor: Michael Kingsley McCourt, Jr., Santa Barbara, CA (US)

(73) Assignee: INVOCA, INC., Santa Barbara, CA (US)

( * ) Notice: Subject to any disclaimer, the term of this patent is extended or adjusted under 35 U.S.C. 154(b) by 44 days.

(21) Appl. No.: 16/359,809

(22) Filed: Mar. 20, 2019

(65) Prior Publication Data

US 2020/0019883 A1    Jan. 16, 2020

Related U.S. Application Data

(60) Provisional application No. 62/698,743, filed on Jul. 16, 2018.

(51) Int. Cl.
*G06N 20/00*      (2019.01)
*G06F 17/18*      (2006.01)
*G06N 7/00*      (2006.01)

(52) U.S. Cl.
CPC .............. *G06N 20/00* (2019.01); *G06F 17/18* (2013.01); *G06N 7/00* (2013.01)

(58) Field of Classification Search
CPC ....... G06N 20/00–20; G06N 3/08–088; G06N 5/00–048
USPC .................................. 706/12, 15–25, 45–61
See application file for complete search history.

(56) References Cited

U.S. PATENT DOCUMENTS

| 8,515,736 | B1* | 8/2013 | Duta | G10L 15/1822 |
| | | | | 704/9 |
| 9,998,596 | B1* | 6/2018 | Dunmire | H04M 3/5158 |
| 2012/0284212 | A1* | 11/2012 | Lin | G06N 20/00 |
| | | | | 706/12 |
| 2018/0198800 | A1* | 7/2018 | Krasser | G06F 21/56 |
| 2018/0212837 | A1* | 7/2018 | Kalluri | H04L 43/0876 |
| 2019/0295003 | A1* | 9/2019 | Dronen | G06N 20/00 |
| 2019/0325259 | A1* | 10/2019 | Murphy | G06K 9/6259 |

(Continued)

OTHER PUBLICATIONS

Parker et al. "An Analysis of Performance Measures for Binary Classifiers", 2011, 11th IEEE International Conference on Data Mining.*

(Continued)

*Primary Examiner* — Jue Louie
(74) *Attorney, Agent, or Firm* — Baker Botts, L.L.P.

(57) ABSTRACT

There are disclosed devices, system and methods for determining a performance score for a trained binary signal classifier (classifier) by determining test output predictions for test input data entries that are input into the classifier. The test outputs are then compared to known outputs of each of the input data entries to determine whether each test output is a true negative (TN), true positive (TP), false negative (FN) or false positive (FP). A number of correct test outputs (R) is defined as a number of the true negative outputs (TN) plus a number of the true positive outputs (TP). A number of incorrect test outputs (W) is defined as a number of the false negative outputs (FN) plus a number of the false positive outputs (FP). The performance score is then calculated using a mathematical expression that decreases as W increases, decreases as TN decreases and decreases as TP decreases.

12 Claims, 7 Drawing Sheets

(56) References Cited

U.S. PATENT DOCUMENTS

2019/0362222 A1* 11/2019 Chen ................. G06N 20/00
2020/0202171 A1* 6/2020 Hughes ................ G06F 8/36

OTHER PUBLICATIONS

Powers, D.M.W., "Evaluation: From Precision, Recall and F-Measure to ROC, Informedness, Markedness & Correlation." 2011, Journal of Machine Learning Technologies, vol. 2, Issue 1.*
Eadline et al. "Practical Data Science with Hadoop and Spark: Designing and Building Effective Analytics at Scale", 2016, Addison_Wesley Professional, Chapter 8.*
Kevin Arvai, "Fine Tuning a classifier in scikit-learn", Jan. 24, 2018, retrieved from: https://towardsdatascience.com/fine-tuning-a-classifier-in-scikit-learn-66e048c21e65.*

* cited by examiner

PERFORMANCE SCORE DETERMINER FOR BINARY SIGNAL CLASSIFIERS

RELATED APPLICATION INFORMATION

This patent claims priority from provisional patent application 62/698,743, filed Jul. 16, 2018, titled SIGNAL CORRECTION USING DOUBLE SIGMOID APPROXIMATION which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to determining a performance score for a binary signal classifier.

Description of the Related Art

Machine learning is a technical field directed to giving computers the ability to learn without being explicitly programmed. Machine learning evolved from the study of pattern recognition and computational learning theory in artificial intelligence (AI). In many cases, it will use a trained model, such as a trained neural network model or trained mathematical model that is trained to predict an output data based on input data. The model can be trained with training data having known inputs and outputs; and then used to predict outputs of actual input data having unknown outputs. One such model is a machine learning binary classifier which predicts an output as either one of two states, based on one or more inputs.

It can be difficult to determine the accuracy (e.g., an "accuracy score") for the predictions of such a trained binary signal classifier operating on actual input data because the correct output may not be known and thus cannot be compared with the predicted output. In addition, depending on how an accuracy score of the classifier is calculated, it may not behave in a predictable way with respect to the training data and/or may not reflect the same accuracy score as an accuracy determined by comparing the predicted outputs to observed outputs.

The accuracy of a model has to be inferred from tests and can never be known with certainty. A number of common misconceptions in statistics render these tests very hard to interpret. In particular, phenomena known as Berkson's paradox, explaining away, and Simpson's paradox can lead to drawing inappropriate conclusions from the tests unless extreme care is taken in the presentation. Thus, a "performance score" that provides a more meaningful performance of the classifier is desired.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

A trained machine learning binary classifier can be used to predict an output as either one of two states, based on one or more inputs. For example, such a classifier can be trained to predict whether a desired signal is or is not present in an input data stream having various signals. The desired signal may be a word, a phrase, a sequence of words, a segment of analog or digital audio, a waveform, or other portion of the input signal. The input signal may be a sample of words, of analog or digital audio, of a waveform (e.g., an audio segment of one or more people speaking), or other of recordable data such as a telephone conversation. The classifier can be trained with audio signal based training data having known inputs and known outputs. Once trained the classifier can be used to predict whether a certain event occurs during actual input data having unknown outputs. That is, the output of the classifier is a prediction of whether a certain signal existed in or was spotted in the actual input data. The input data may be a text or transcribed version of the audio signal and the actual input data may be real audio from telephone calls by customers of a business that is implementing the classifier to predict the outputs.

However, such a prediction may not be valuable unless the performance of the prediction can be determined or estimated. For example, a business that sells products over the phone may use such a classifier that is trained to predict whether a sale of a product occurred during a phone conversation by spotting certain signals or words in the audio signal of the conversation when it is input to the classifier. It can be appreciated that the business may want to know the performance (e.g., a "performance score") of these predictions.

Technologies described herein provide an performance score determiner to automatically determine a meaningful performance score for trained binary signal classifiers. The determiner may determine an performance score by determining a set of test outputs by inputting input data entries of a set of test data entries into the trained machine learning binary classifier and identifying the predicted output for each input data entry as the corresponding test outputs. The determiner then compares the test outputs to known outputs of each of the set of test data entries to determine whether each test output is a true negative (TN) output, a true positive (TP) output, a false negative (FN) output or a false positive (FP) output. After the comparison, the determiner defines a number of correct test outputs (R) as a number of the true negative outputs (TN) plus a number of the true positive outputs (TP); and defines a number of incorrect test outputs (W) as a number of the false negative outputs (FN) plus a number of the false positive outputs (FP). The determiner then calculates a performance score of the trained machine learning binary classifier using a mathematical expression that decreases as W increases, decreases as TN decreases and decreases as TP decreases.

Figure 1:
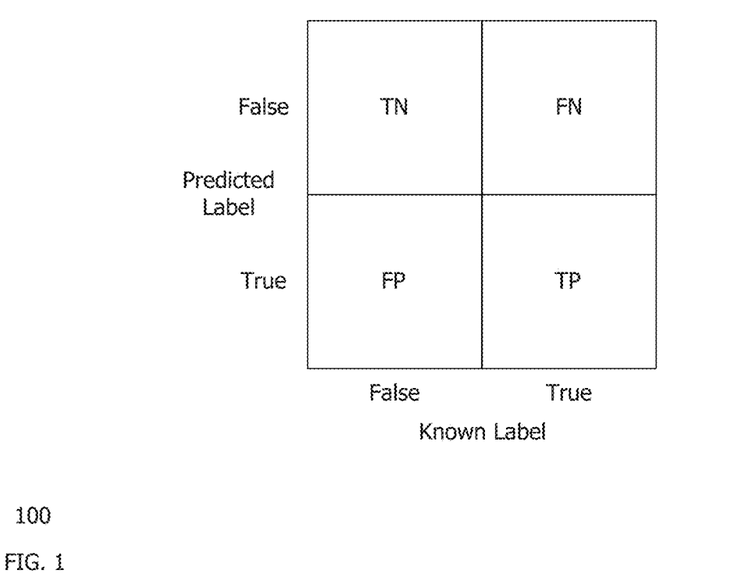
FIG. 1 is a representation of predicted labels output by trained binary signal classifier as compared to actual/known labels for a set of input data.

FIG. 1 is a representation 100 of predicted labels output by a trained binary signal classifier as compared to known (e.g., actual and/or correct) labels for a set of input data. Representation 100 is a confusion matrix, which succinctly expresses all possible outcomes of a test. Representation 100 can express a trained binary signal classifier's (e.g., the trained model of the classifier) performance against a test set of test data (see also FIG. 5).

Representation 100 shows the vertical axis of a table with true (T) and false (F) predicted output labels and the horizontal axis of the table with known true (T) and false (F) output labels for a set of known input data. For example, representation 100 can show the predicted output labels of either T or F as compared to the known output labels of either T or F of training data for a trained binary signal classifier.

The known output labels may be determined by reviewing (e.g., machine determination from and/or human observation of) actual input data of a set of test data entries, and identifying an output label corresponding to each of actual input data. In some cases, a known output may be an estimated output, confirmed output, proven output or otherwise determined binary output that is identified as correct for the input data. The training data may be input data which has been reviewed by a person who has identified a known (e.g., a correct or proper) output for that data (e.g., "ground truths"). For instance, an analyst may listen to or read a transcript of audio of a phone call (e.g., input of the training data) to determine whether an event occurred during the call (e.g., if a sale was made) and select a binary output (e.g., output of the training data) for that phone call. Such data with known input and outputs may also be described as test data entries for determining an accuracy score and/or a performance score for the trained classifier.

Here, there are four possible outcomes, which we can express in a table as true negative (TN) which indicates the predicted output label is a binary false (e.g., negative, minus or -) and is the same as the known output label which is a binary false; false negative (FN) which indicates the predicted output label is a binary false and is not the same as the known output label which is a binary true (e.g., positive, plus or +); true positive (TP) which indicates the predicted output label is a binary true and is the same as the known output label which is a binary true; and false positive (FP) which indicates the predicted output label is a binary true and is not the same as the known output label which is a binary false.

The trained binary signal classifier may be a binary signal classifier, binary machine classifier or binary classifier model that has been trained with training data to classify one or more input signals as including a signal (a true) or not including (e.g., as excluding) the signal (a false). In some cases, the binary signal classifier is or includes a classification model, such as logistic regression model; neural network, perceptron, multi-layer perceptron, naïve Bayes/Bayes, decision tree, random forest, deep neural network, etc.

An accuracy score (e.g., a score) may be used to determine an amount (e.g., fraction, percentage, etc.) of the predictions of a trained binary signal (e.g., a classifier) that are correct or successful. For example, an accuracy score may show an accuracy of whether the predicted labels output by the classifier during use are the same as the known labels for a set of input data. The score may indicate a fraction or percentage of the predicted output label values (e.g., true or false) that are or are not the same as the known output label value (e.g., true or false). The accuracy score may be shown in a confusion matrix, which can express the classifier's accuracy against a test set of test data (e.g., see FIG. 1).

Because humans tend to select non-random samples for review, the accuracy score may not reflect a reviewer's experience unless significant care is taken in the calculation. This phenomenon is known as Berkson's paradox and is a frequent cause for misinterpretation and misuse of machine-learning models. For example, one process for estimating an accuracy score of a trained machine learning binary classifier is shown in the equations 1 and 2:

$$\text{"True Accuracy"} = \frac{TP}{TP + FN}, \quad (1)$$

$$\text{"False Accuracy"} = \frac{TN}{TN + FP}, \quad (2)$$

where TN, FN, TP and FP are as noted for FIG. 1; and True Accuracy and False Accuracy represent the fraction of true and false outcomes that were correctly identified or predicted by the model. This process can be implemented as, by or in a system, device, computing device, algorithm, electronic hardware and/or computer software (e.g., a non-volatile machine readable medium storing programs or instructions).

However, the equations 1 and 2 may not reflect a score that provides a meaningful performance of the classifier or may not behave in a predictable way with respect to training data and/or may not reflect the same performance score as an performance determined by comparing the predicted outputs to observed outputs. Instead, they may provide a score that more appropriately reflects the sensitivity of the classifier instead of its performance. For example, the scores of equations 1 and 2 may be a noisy metric, and thus subject to having scores that jump around numerically. Also, the scores of equations 1 and 2 can be misleading because it compares known outcomes to predicted outcomes. Often, human reviewers compare predicted outcomes to observed ones, which is different in important ways.

An example can be used to show that the scores of equations 1 and 2 are a noisy metric. Using the equations 1 and 2 the score of a certain trained machine learning binary classifier was calculated as an accuracy of about 89%. To improve this classifier, more training data than what was previously used to train the classifier was collected and used to re-train the classifier. However, according to the equations 1 and 2 the score of the re-trained classifier dropped to 86% which is confusing since more data was used to train it which should result in a better model, and thus a better score. After further calculations that show the percentage of uncertainty in the score, we can determine that what happened was the accuracy of the classifier changed from something like (89±15) % to something like (86±7) % ... indicating the accuracy very likely was better, not worse, after re-training. But, the scores of the equations 1 and 2 do not indicate the percentage of uncertainty in the score. This uncertainty is much larger than most people intuitively expect, so it's important for us to determine and consider it clearly.

The scores of the equations 1 and 2 can be misleading, such as by not providing a score that is what anyone expects when they hear the word "accuracy." For instance, consider a trained classifier for predicting "Purchase Made" of telephone call audio from customer, having scores of the equations 1 and 2 that show it is 90% accurate. Based on this accuracy number, if 10 calls of the input/classified data are listened to (e.g., listened to by a person to determine if a sale was made) which were predicted to have a purchase (e.g., predicted true in the input signal), one might expect nine out of the ten to be correct. However, this could be wrong! If the conversion rate or rate of purchases made for the input calls is only 10%, then in fact only half of ten would be correct. In other words, it may not be possible to really know the accuracy of a model, so the accuracy may have to be determined experimentally. Such experiments are uncertain, and if they do not take that randomness/uncertainty into account, badly incorrect conclusions can be drawn about the accuracy of the model.

Why would only half instead of 9 of 10 be correct? Consider that according to the equations 1 and 2, the quoted accuracy is defined as equation 3 (the same as True Accuracy of equation 1):

$$\frac{TP}{TP+FN} \quad (3)$$

but when the calls predicted to be true are spot-checked, the check is instead calculating equation 4:

$$\frac{TP}{TP+FP} \quad (4)$$

which is not the same an any of equations 1-3.

For equation 4, since the conversion rate is low, around 10%, the number of actual false outcomes (around 90%) is much greater than the number of actual true outcomes (around 10%). Thus, the number of false positives FP is much greater than the number of false negatives FN and the "accuracy" measured by spot-checking the calls is much lower than the "accuracy" score according to the equations 1 and 2. Moreover, there's no good way to know the number of false negatives FN, unless every call is spot-checked (e.g., listened to by a person to determine if a sale was made) so the accuracy score of the equations 1 and 2 is unconfirmable. So, the accuracy score of the equations 1 and 2 is technically correct, but can be surprising and even misleading.

However, a more intuitive score can be used to measure the performance of a classifier. For example, one process for estimating a performance score of a trained machine learning binary classifier is shown in the equations 5-7:

$$R=TN+TP \quad (5)$$

$$W=FN+FP \quad (6)$$

where R (e.g., right) defines the total number of predictions (e.g., binary labels) by the classifier that are correct; W (e.g., wrong) defines the total number of predictions (e.g., binary labels) by the classifier that are incorrect; and TN, FN, TP and FP are as noted for FIG. 1. For example, R is the aggregate of the counts of true negative and true positive outputs of the trained classifier; and W is the aggregate of the counts of false negative and false positive outputs of the trained classifier. Using equations 5-6 it is possible to create a performance score P to measure the performance of a classifier using equation 7:

$$"P" = \frac{4}{4 + \frac{W \times R}{TN \times TP}} \quad (7)$$

where, for a set of test data having entries with known inputs and outputs, R defines the total count (e.g., number) of correct predictions by the classifier for the entries of the test data (e.g., see equation 5); W defines the total count of incorrect predictions by the classifier for the entries of the test data (e.g., see equation 6); TN indicates the total count of true negative predictions for the entries of the test data; TP indicates the total count of true positive predictions for the entries of the test data; 4 is a whole number or scalar; + is the addition symbol; and x× is the multiplication symbol.

This performance score may be a more intuitive performance score due to the mathematics and/or model of the equation 7. For example, according to equation 7, if W is a large count (e.g., a high number), then the performance score will be a small number (e.g., a low number). Similarly, if TN or TP is a small count (e.g., a low number), then the performance score will be a small number (e.g., a low number). Thus, the performance score is a small number (indicating a low performance for the classifier) when the total count of incorrect predictions by the classifier is large, when the total count of true negative predictions by the classifier is small and/or when the total count of true positive predictions by the classifier is small. In fact, the performance score is small if W is large, if TN is small or if TP is small. In some cases, the performance score penalizes all the things a user of the classifier may expect to be penalized (e.g., large W, small TN and small TP), and consequently is a more meaningful and predictable score for the user. It may thus be less likely to surprise a user or business implementing the classifier. For example, if an event occurs only 1% of the time, a machine learning model can achieve a very high accuracy score of 99% by simply predicting 'F' every time. But this is a useless model which will never identify a true example. The accuracy in this case does not reflect the performance of the model, but the performance score for this model (which is zero) more properly reflects our subjective opinions about the utility of this model.

Determining the performance score can be implemented as, by or in a system, device, computing device, algorithm, electronic hardware and/or computer software (e.g., a non-volatile machine readable medium storing programs or instructions). In some cases, all or parts of the performance score may be used in a mathematical expression, an algorithm, computer implementable instructions and/or an equation to estimate a performance (e.g., successfulness) during use of any trained binary output model such as a trained machine learning binary classifier. For example, any mathematical expression including one or more of the concepts of the performance score may be used to estimate a performance during use of any trained binary output model or classifier.

More particularly, in some cases, a performance score of a trained machine learning binary classifier may be calculated using a mathematical expression that decreases as W increases, as TN decreases and as TP decreases. In some cases, a performance score of a trained machine learning binary classifier may be calculated using a mathematical expression that is inversely proportional to a term that is directly proportional to W and inversely proportional to TN and/or TP. In some cases, a performance score of a trained machine learning binary classifier may be calculated using a mathematical expression that is a scalar divided by (a scalar plus a term directly proportional to R and inversely proportional to TN and TP). In some cases, a performance score of a trained machine learning binary classifier may be calculated using a mathematical expression that is a scalar divided by (the scalar plus (a term directly proportional to R and W; and inversely proportional to TN and TP)).

It is also possible to discuss advantages of the descriptions herein for determining a performance score of a binary classifier by quantifying the uncertainty in model accuracy scores of binary classifiers. For example, if we have a classifier (e.g., a binary classifier or model of a binary classifier) that is 85% accurate, it gives the right answer 85% of the time. In the real world, unfortunately, there may be no way of knowing this accuracy. It may have to be measured by running the classifier on some test data and seeing how accurate the classifier is by comparing the test data known outputs to those predicted by the classifier.

In this example, the input data may be the saved (e.g., stored in a computer memory) audio or transcription of 50 phone calls from customers; and the accuracy represents the classifier predicting the right answer for 44 of the calls and the wrong answer for 6 of the calls. Using equations 1-2 to calculate the accuracy score, provides an accuracy of 88%.

Then, some of the parameters (e.g., mathematical model parameters or neural network weights of nodes) of the classifier are updated or changed to improve this accuracy, and the accuracy is measured again by re-running the classifier on the same test data and seeing how accurate the classifier is by comparing the test data known outputs to those newly predicted by the classifier. This time, the classifier gets 42 right and 8 wrong, yielding an accuracy of 84%. Did the classifier actually get worse, or is this just noise as previously noted. Can one conclude from this that the updates were bad and revert to the prior parameters?

In this case, since it is stipulated that the true accuracy is 85%, this question is easy to answer. With a known average failure rate 1−a, the number of failures f we should expect in 50 trials is given by the binomial distribution:

$$P(f) = \binom{50}{f} \cdot (1-a)^f a^{50-f} \tag{8}$$

Figure 2:
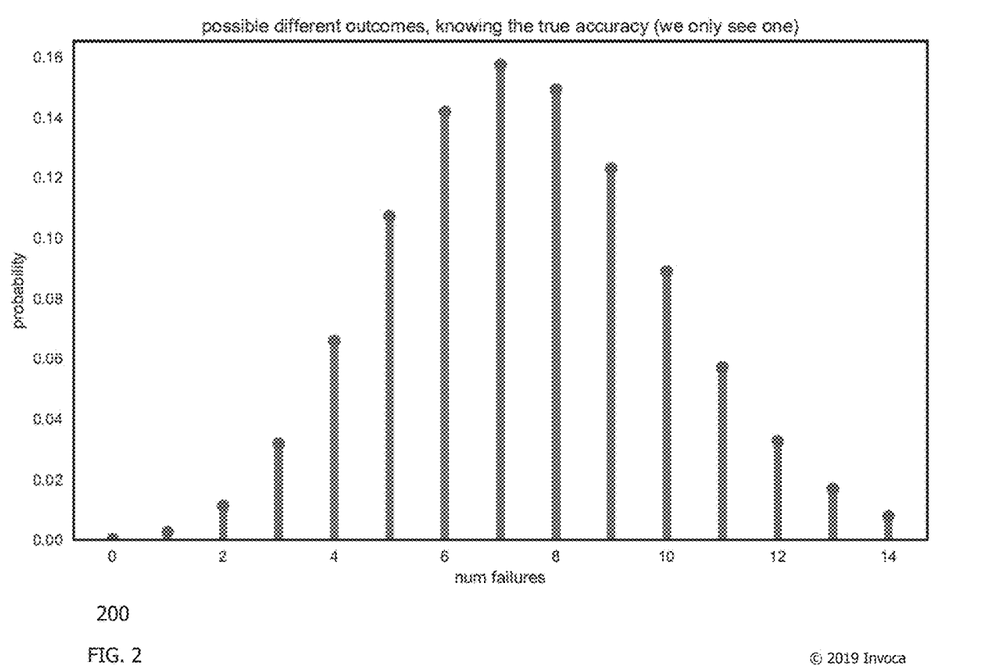
FIG. 2 is a graph showing possible different outcomes, for a determiner of accuracy scores for a trained binary signal classifier.

This distribution can be shown by FIG. 2 which is a graph 200 showing possible different outcomes, for a determiner of accuracy scores for a trained binary signal classifier. Graph 200 has a horizontal X-axis of the number of failures for each of the possible different outcomes of the classifier and a vertical Y-axis of the probability of each of the outcomes for multiple tests using different sets of test data. The graph 200 may be an example where the true/actual accuracy of the model is known (e.g., see the case above where it is somehow known that the true accuracy of the model is 85%), and the accuracy of the determiner is calculated. So, the probabilities of the vertical axis can be from multiple tests using different sets of test data. For example, a set of test data can be 50 audio recordings of phone conversations between 2 parties, a known outcome of each recording is determined by a person who listens to each of the 50 calls, and the number of failures of the model determined by comparing her model's predicted labels for the test data against the known outcome. Here, the estimate of the accuracy will differ somewhat from the true number due to randomness in the test. Now, another test performed using another set of test data (e.g., a new set of 50 calls) will result in a different estimate and a different number of failures. After a number of tests are performed using various sets of test data, the different number of failures can be added for each of the different test outcomes to produce the plot 200 shown in FIG. 2. If an infinite number of tests are performed using an infinite number of sets of test data, the peak of that graph 200 coincides with the true accuracy of the model.

But in reality, it is not practical to repeat the test hundreds or thousands of times to make a plot like that. Often it is only possible to perform one single test and infer what the accuracy might be based on that test. Ignoring the uncertainty in the test, can lead to badly incorrect conclusions. One test might find an accuracy of 96% and conclude that big bets can be made based on the model predictions. However, another test might find an accuracy of 70% and conclude the model ca not be trusted all. Both would be wrong in this case.

Specifically, calculating the accuracy using equations 1 and 2 can give an accuracy of anything from 72% to 96%. Thus, there can be a significant error in the determination, which is not at all obvious to most users. For example, as shown by the graph 200, there is absolutely no meaningful difference between seeing 6 failures or 8 failures. In fact, according to the graph 200 it is entirely possible to see anywhere from 2 to 14 failures, corresponding to estimated accuracies of 96% to 72%.

It is also noted that the graph 200 presumes somehow knowing the true accuracy of the classifier. But in the real world, the true accuracy may never be known. Consequently, it may be important to have a determiner to determine or measure a "performance score" for the predictions of a trained binary signal classifier operating on actual input data even though the correct outputs may not be known (and thus cannot be compared with the predicted outputs).

Figure 3:
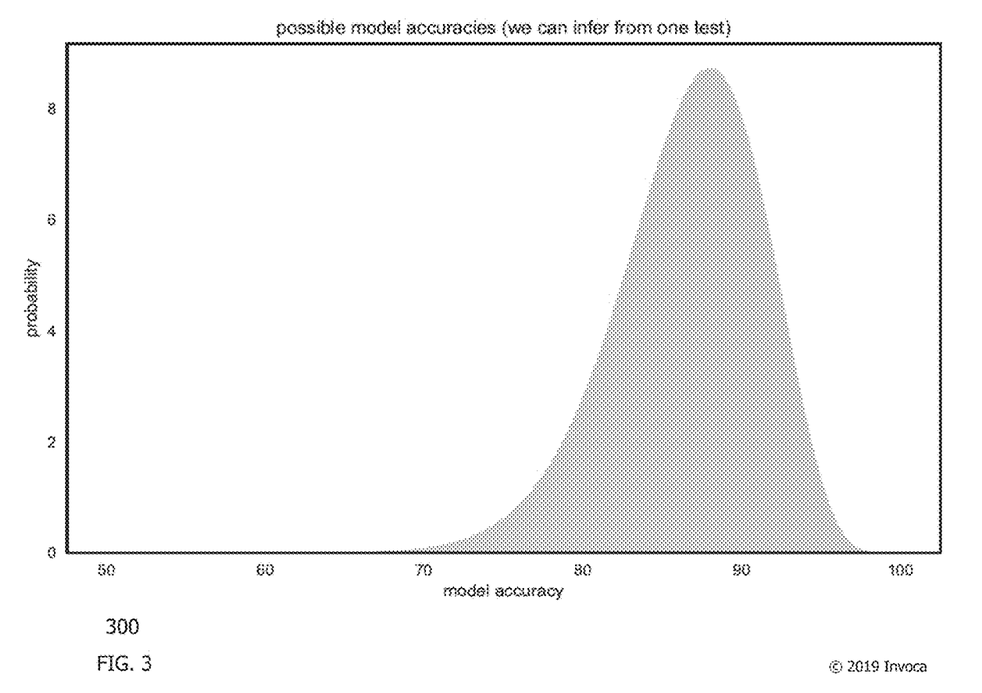
FIG. 3 is a graph showing possible model accuracies that are inferred for a determiner of accuracy scores for a trained binary signal classifier.

It is also possible to discuss advantages of the descriptions herein for determining a performance score of a binary classifier by using an equation called Bayes' theorem to invert the problem of using a binomial distribution to quantify the uncertainty in model accuracy scores of binary classifiers. That is, instead of using the binomial distribution of FIG. 2, Bayes' theorem can be used to express the probability distribution of the classifier's accuracy. This problem in statistics can be solved and turns out to be something called the beta distribution. For example, FIG. 3 is a graph 300 showing possible model accuracies that are inferred for a determiner of accuracy scores for a trained binary signal classifier. Graph 300 has an X-axis of the possible model accuracies in percentage of the classifier and a Y-axis of the probability of each of the possible accuracies. Graph 300 may plot the possible model accuracies that can be inferred (or would be measured) by running the classifier on a single set of test data and seeing how accurate the classifier is by comparing the test data known outputs to those predicted by the classifier.

As shown by graph 300, based on this single test, we expect the estimated model accuracy in the 80-90% range, but it is entirely possible that the accuracy would be estimated to be as low as 75% or as high as 95%. Note that the classifier does have a true accuracy, but we do not know what it is. Graph 300 reflects knowledge about that accuracy, based on what we can infer from the single test.

Figure 4:
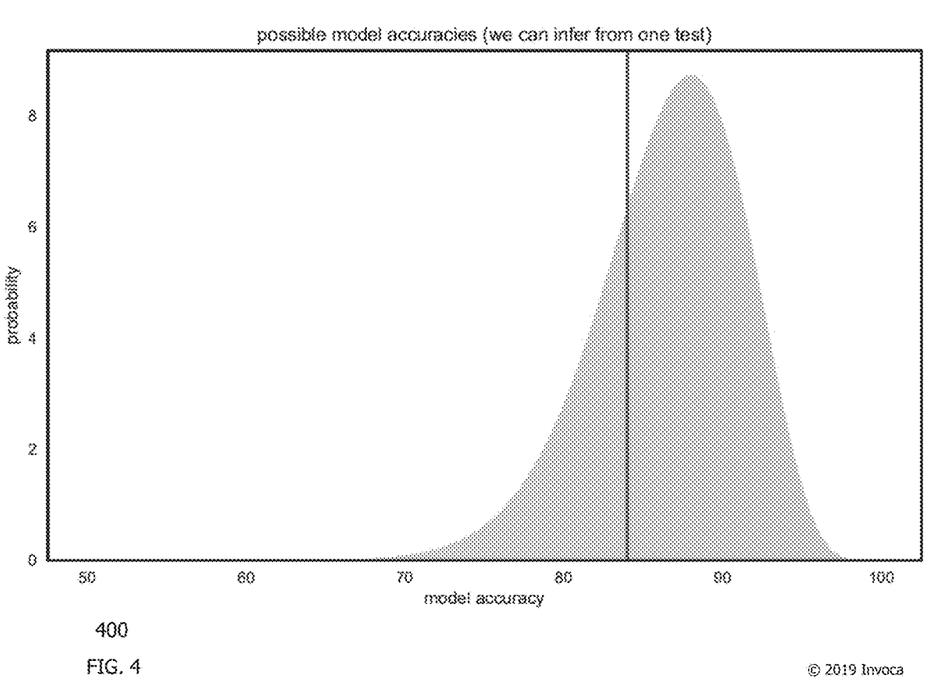
FIG. 4 is a graph showing possible model accuracies that are inferred for a determiner of accuracy scores for a trained binary signal classifier.

Next, the earlier described scenario where some of the parameters of the classifier are updated to improve this accuracy is applied here. That is, using those same updated parameters, the accuracy is measured again by re-running the classifier on the same test data, and based on the re-test, eight failures are found for a new accuracy of 84%. Using the data of graph 300 we can determine whether the updates to the parameters actually made the classifier more or less accurate. For example, FIG. 4 is a graph 400 showing the possible model accuracies that are inferred for a determiner of accuracy scores for a trained binary signal classifier of FIG. 3 as comparing the new accuracy of 84% which is represented by a vertical line at 84% along the model accuracy axis. As shown by the new accuracy of 84% which is represented by a vertical line at 84% along the model accuracy axis, there's a 73% chance the updates made the classifier worse (e.g., the area under the curve of the plot of possible accuracies to the right of the line), and a 27% chance that it stayed the same or got better (e.g., the area under the curve of the plot of possible accuracies to the left of the line). However, since these are only probabilities, we don't have enough information to draw any conclusions.

So, we now discuss advantages of the descriptions herein for determining a performance score of a binary classifier by calculating the uncertainty in the equation 7 (the performance score). One way to do this is to use an approximate technique called a Monte-Carlo calculation. If we do not know how to do an uncertainty calculation for equation 7, an ensemble of statistically equivalent results can be generated, the score for each of these results can be computed, and the distribution of these scores can be returned.

Figure 5:
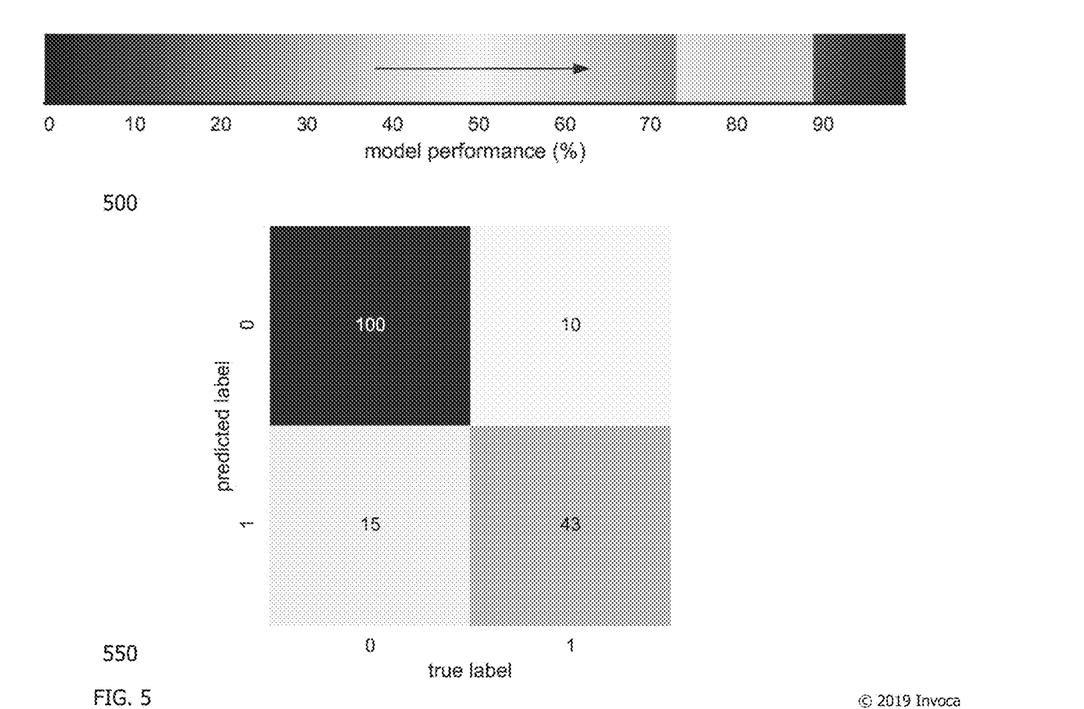
FIG. 5 is a representation of the uncertainty of a determiner of performance scores for a trained binary signal classifier.

For example, FIG. 5 is a representation 500 of the uncertainty of a determiner of performance scores for a trained binary signal classifier using equation 7. FIG. 5 shown classifier performance percentage as a brightness chart 500 with higher certainties in darker color in the direction to arrow is pointing the right and the score shown by the light rectangle around 80%. It also shows performance of predicted labels to true labels in confusion matrix 550 colored with the brightness of the chart 500 to the right of 50%. The numbers in the confusion matrix squares correspond to the results from a hypothetical test. The top plot 500 shows what can be inferred about the model, based on this limited test. Since the performance score is a careful calculation, matrix 550 does not just have a single answer but a range of possible values which expresses an uncertainty in the number shown in matrix 550. As can be seen in FIG. 5, chart 550 shows an answer to the problem discussed above, such as for FIG. 2. FIG. 5 may be for a single test with as set of test data for 168 calls (e.g., as noted for FIG. 2). In this test, there were 100 True Negatives, 43 True Positives, 10 False Negatives, and 15 False Positives, as shown in the confusion matrix 550. This single test, therefore, provides an overall accuracy of 85%. But as discussed above, it would be misleading to take this number seriously. The upper, 'thermometer' plot 500 shows the outcome of the Monte-Carlo calculation which provides and expected accuracy or performance score according to equation 7 as being anywhere between ~72% and ~89%. Notably, the word accuracy may be an over-simplified description of plot 500, since the thermometer shows the performance score from equation 7, not simply the accuracy.

Figure 6:
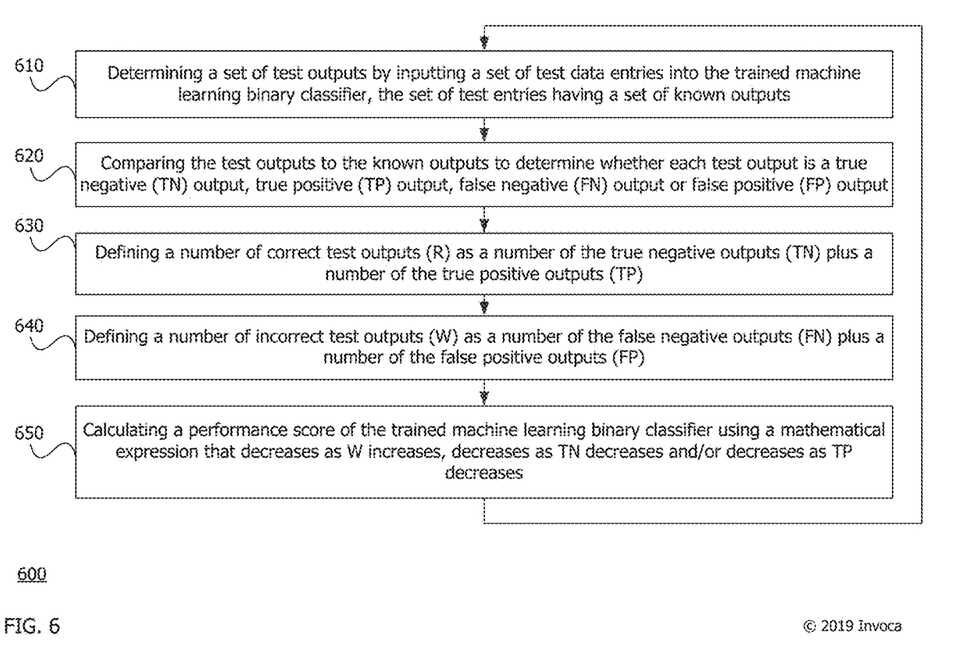
FIG. 6 is an operating environment/process for determining performance scores for trained binary signal classifiers.

FIG. 6 is an operating environment/process 600 for determining performance scores for trained binary signal classifiers. Process 600 begins at 610 and ends at 650 but can optionally be repeated, such as shown by the arrow from 650 to 610. For example, process 600 can be repeated for different classifiers or after updating the parameters of a single classifier (e.g., as noted for FIGS. 2-5).

At 610 a set of test outputs is determined by inputting a set of test data entries into the trained machine learning binary classifier, the set of test entries having a set of known outputs. Inputting at 610 may be considered testing the classifier and the test data may be training data. Inputting at 610 may include descriptions herein for running a test or inputting test data inputs to determine predicted test data outputs as described herein.

After 610, at 620 the test outputs are compared to the known outputs to determine whether each test output is a true negative (TN) output, true positive (TP) output, false negative (FN) output or false positive (FP) output. Comparing at 620 may include descriptions herein for comparing test data predicted outputs to known (or correct) outputs for test data or training data.

After 620, at 630 a number of correct test outputs (R) are defined as a number of the true negative outputs (TN) plus a number of the true positive outputs (TP). Defining at 630 may include descriptions herein for defining the total count (e.g., number) of correct predictions by the classifier for the entries of the test data (e.g., see equation 5).

After 630, at 640 a number of incorrect test outputs (W) are defined as a number of the false negative outputs (FN) plus a number of the false positive outputs (FP). Defining at 640 may include descriptions herein for defining the total count (e.g., number) of incorrect predictions by the classifier for the entries of the test data (e.g., see equation 6).

After 640, at 650 a performance score of the trained machine learning binary classifier is calculated using a mathematical expression that decreases as W increases, decreases as TN decreases and/or decreases as TP decreases. Calculating at 650 may include any of the descriptions herein for calculating a score using equation 7, calculating a performance score and/or calculating a performance score for a binary classifier.

According to descriptions herein in it is possible to create a determiner to determine a "performance score" for the predictions of a trained binary signal classifier operating on actual input data even though the correct outputs may not be known (and thus cannot be compared with the predicted outputs). In addition, the determiner may provide a performance score that incorporates information about both the accuracy of the model and the difficulty of the classification task it is used for. Moreover, the score may carefully determine the degree of certainty that can be drawn about the model from the limited amount of information available. Together, these properties make the score behave in a predictable way, such as with respect to the training data and reflect the same performance score as a performance determined by comparing the predicted outputs to observed outputs.

Figure 7:
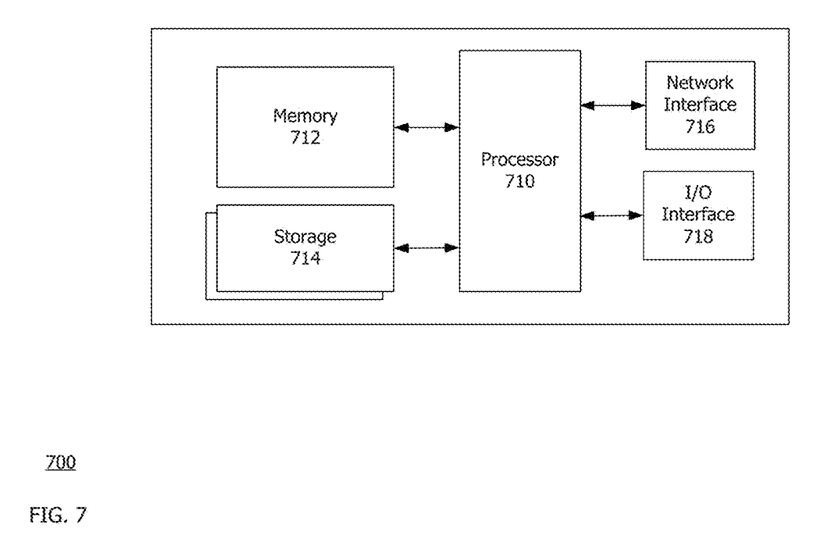
FIG. 7 is a block diagram of a determiner for determining performance scores for trained binary signal classifiers.

For example, FIG. 7 is a block diagram of a determiner for determining performance scores for trained binary signal classifiers. The determiner may be represented by computing device 700 and may be configured to determine performance scores for a binary classifier as described herein. It may be a desktop or laptop computer, a server computer, a tablet, a smartphone or other mobile device. The computing device 700 may include software and/or hardware for providing functionality and features described herein. The computing device 700 may therefore include one or more of: logic arrays, memories, analog circuits, digital circuits, software, firmware and processors. The hardware and firmware components of the computing device 700 may include various specialized units, circuits, software and interfaces for providing the functionality and features described herein. For example, a global positioning system (GPS) receiver or similar hardware may provide location-based services.

The computing device 700 has a processor 710 coupled to a memory 712, storage 714, a network interface 716 and an I/O interface 718. The processor 710 may be or include one or more microprocessors, field programmable gate arrays (FPGAs), application specific integrated circuits (ASICs), programmable logic devices (PLDs) and programmable logic arrays (PLAs).

The memory 712 may be or include RAM, ROM, DRAM, SRAM and MRAM, and may include firmware, such as static data or fixed instructions, BIOS, system functions, configuration data, and other routines used during the operation of the computing device 700 and processor 710. The memory 712 also provides a storage area for data and instructions associated with applications and data handled by the processor 710. As used herein the term "memory" corresponds to the memory 712 and explicitly excludes transitory media such as signals or waveforms.

The storage 714 provides non-volatile, bulk or long-term storage of data or instructions in the computing device 700. The storage 714 may take the form of a magnetic or solid state disk, tape, CD, DVD, or other reasonably high capacity addressable or serial storage medium. Multiple storage devices may be provided or available to the computing device 700. Some of these storage devices may be external to the computing device 700, such as network storage or cloud-based storage. As used herein, the terms "storage" and "storage medium" correspond to the storage 714 and explicitly exclude transitory media such as signals or waveforms. In some cases, such as those involving solid state memory devices, the memory 712 and storage 714 may be a single device.

The network interface 716 includes an interface to a network such as a network that can be used to communicate calls, signals, streams, arrays, flagged samples and feedback described herein. The network interface 716 may be wired or wireless.

The I/O interface 718 interfaces the processor 710 to peripherals (not shown) such as displays, video and still cameras, microphones, keyboards and USB devices.

In some cases, storage 714 is a non-volatile machine-readable storage medium that includes all types of computer readable media, including magnetic storage media, optical storage media, and solid state storage media. It should be understood that the software can be installed in and sold with the device 700. Alternatively, the software can be obtained and loaded into the device 700, including obtaining the software via a disc medium or from any manner of network or distribution system, including from a server owned by the software creator or from a server not owned but used by the software creator. The software can be stored on a server for distribution over the Internet.

Some technologies described for the determiner or computing device 700 may include numerous units.

The technologies described herein provide various technological improvements to computer performance and efficiently. For example, the determiner 700 and/or the process 600 provide a much more accurate and efficient device and/or process for determining performance scores for trained binary signal classifiers. For example, the technologies described are technological improvements over those of the past because they can: (1) more accurately determine a performance score for the predictions of a trained binary signal classifier operating on actual input data even though the correct outputs may not be known (and thus cannot be compared with the predicted outputs); (2) behave in a predictable way with respect to the training data; and (3) reflect the same performance score as a performance determined by comparing the predicted outputs to observed outputs. Prior technologies, such as those that determine accuracy scores, do have such improvements.

Within this description, the term "computing device" may mean a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic devices (PLD), or a programmable logic arrays (PLA). The gate netlist or other physical description may be converted into process instructions and masks for fabricating the engine within an application specific integrated circuit (ASIC).

Within this description, the term "unit" also means a collection of hardware, firmware, and/or software, which may be on a smaller scale than a "computing device". For example, a computing device may contain multiple units, some of which may perform similar functions in parallel. The terms "computing device" and "unit" do not imply any physical separation or demarcation. All or portions of one or more units and/or computing devices may be collocated on a common card, such as a network card, or within a common FPGA, ASIC, or other circuit device.

A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The determiner may include a processor and/or a determiner unit. These units may be hardware, software, firmware, or a combination thereof. Additional and fewer units, modules or other arrangement of software, hardware and data structures may be used to achieve the processes and apparatuses described herein.

Closing Comments

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A computer-implemented method for improving a machine learning classifier configured to determine whether a sale of a product occurred during a phone conversation, the method performed by one or more computing devices, the method comprising:

determining a first set of test outputs by inputting a set of test data entries into a trained machine learning binary classifier, each test data entry in the set of test data entries comprising a digital audio signal from a recorded telephone call, the digital audio signal comprising a set of first labeled outputs representing certain spoken word or words, each test output in the first set of test outputs comprising a prediction of whether a respective test data entry of the set of test data entries comprises an audio signal corresponding to the certain spoken word or words;

comparing the first test outputs to the first labeled outputs representing the certain spoken word or words to determine a first number of true negative outputs (TN), a first number of true positive outputs (TP), a first number of false negative outputs (FN), and a first number of false positive outputs (FP);

defining a first number of correct test outputs (R) as the first number of TN plus the first number of TP;

defining a first number of incorrect test outputs (W) as the first number of the FN plus the first number of FP;

calculating, using a mathematical expression, a first performance score of the trained machine learning binary classifier that represents a level of accuracy of the trained machine learning binary classifier in predicting whether the test output comprises audio signals corresponding to the certain spoken word or words, the first performance score being calculated based on the first number of R, the first number of W, the first number of TN, and the first number of TP, the mathematical expression being (a scalar)/(a scalar plus a term directly proportional to the first number of R and inversely proportional to the first number of TN and the first number of TP);

evaluating performance of the trained machine learning binary classifier based on the calculated first performance score by determining that the calculated first performance score is smaller than a first predetermined number that indicates that the first number of incorrect test outputs is larger than a second predetermined number;

re-training the trained machine learning binary classifier with audio signal based training data having second labeled inputs and outputs representing certain spoken word or words by updating parameters of the trained machine learning binary classifier, the updating the parameters comprising changing one or more model parameters or one or more neural network weights of nodes; and repeating the determining, comparing, defining, and calculating steps for a second performance score of the trained machine learning binary classifier after the re-training, one or more times, by:

determining a second set of test outputs by inputting the set of test data entries into the re-trained machine learning binary classifier, each test output in the second set of test outputs comprising a prediction of whether the respective test data entry of the set of test data entries comprises an audio signal corresponding to the certain spoken word or words;

comparing the second test outputs to the second labeled outputs to determine a second number of TN, a second number of TP, a second number of FN, and a second number of FP;

defining a second number of R as the second number of TN plus the second number of TP;

defining a second number of W as the second number of FN plus the second number of FP; and calculating, using the mathematical expression, a second performance score of the re-trained machine learning binary classifier that represents a level of accuracy of the re-trained machine learning binary classifier in predicting whether the test output comprises audio signals corresponding to the certain spoken word or words, the second performance score being calculated based on the second number of R, the second number of W, the second number of TN, and the second number of TP.

2. The method of claim 1, wherein the mathematical expression is (a scalar)/(the scalar plus (a term directly proportional to R and W; and inversely proportional to TN and TP)).

3. The method of claim 1, wherein the mathematical expression is performance=$4/(4+((W \times R)/(TN \times TP)))$.

4. The method of claim 1, further comprising:

creating the set of test data entries from an audio recording of the recorded telephone call; and determining the set of first labeled outputs by human observation or machine processing of the set of test data entries.

5. An apparatus comprising:
a processor;
a memory coupled to the processor, the memory storing program instructions that, when executed, cause the computing device to perform actions, comprising:
determining a first set of test outputs by inputting a set of test data entries into a trained machine learning binary classifier, each test data entry in the set of test data entries comprising a digital audio signal from a recorded telephone call, the digital audio signal comprising a set of first labeled outputs representing certain spoken word or words, each test output in the first set of test outputs comprising a prediction of whether a respective test data entry of the set of test data entries comprises an audio signal corresponding to the certain spoken word or words;
comparing the first test outputs to the first labeled outputs representing the certain spoken word or words to determine a first number of true negative outputs (TN), a first number of true positive outputs (TP), a first number of false negative outputs (FN), and a first number of false positive outputs (FP);
defining a first number of correct test outputs (R) as the first number of TN plus the first number of TP;
defining a first number of incorrect test outputs (W) as the first number of the FN plus the first number of FP;
calculating, using a mathematical expression, a first performance score of the trained machine learning binary classifier that represents a level of accuracy of the trained machine learning binary classifier in predicting whether the test output comprises audio signals corresponding to the certain spoken word or words, the first performance score being calculated based on the first number of R, the first number of W, the first number of TN, and the first number of TP, the mathematical expression being (a scalar)/(a scalar plus a term directly proportional to the first number of R and inversely proportional to the first number of TN and the first number of TP);
evaluating performance of the trained machine learning binary classifier based on the calculated first performance score by determining that the calculated first performance score is smaller than a first predetermined number that indicates that the first number of incorrect test outputs is larger than a second predetermined number;
re-training the trained machine learning binary classifier with audio signal based training data having second labeled inputs and outputs representing certain spoken word or words by updating parameters of the trained machine learning binary classifier, the updating the parameters comprising changing one or more model parameters or one or more neural network weights of nodes; and
repeating the determining, comparing, defining, and calculating steps for a second performance score of the trained machine learning binary classifier after the re-training, one or more times, by:
determining a second set of test outputs by inputting the set of test data entries into the re-trained machine learning binary classifier, each test output in the second set of test outputs comprising a prediction of whether the respective test data entry of the set of test data entries comprises an audio signal corresponding to the certain spoken word or words;
comparing the second test outputs to the second labeled outputs to determine a second number of TN, a second number of TP, a second number of FN, and a second number of FP;
defining a second number of R as the second number of TN plus the second number of TP;
defining a second number of W as the second number of FN plus the second number of FP; and
calculating, using the mathematical expression, a second performance score of the re-trained machine learning binary classifier that represents a level of accuracy of the re-trained machine learning binary classifier in predicting whether the test output comprises audio signals corresponding to the certain spoken word or words, the second performance score being calculated based on the second number of R, the second number of W, the second number of TN, and the second number of TP.

6. The apparatus of claim 5, wherein the mathematical expression is (a scalar)/(the scalar plus (a term directly proportional to R and W; and inversely proportional to TN and TP)).

7. The apparatus of claim 5, wherein the mathematical expression is performance=4/(4+((WxR)/(TNxTP))).

8. The apparatus of claim 5, the program instructions cause the computing device to perform further actions, comprising:
creating the set of test data entries from an audio recording of the recorded telephone call; and
determining the set of first labeled outputs by human observation or machine processing of the set of test data entries.

9. A non-transitory machine readable medium storing a program having instructions which, when executed by a processor, cause the processor to perform:
determining a first set of test outputs by inputting a set of test data entries into a trained machine learning binary classifier, each test data entry in the set of test data entries comprising a digital audio signal from a recorded telephone call, the digital audio signal comprising a set of first labeled outputs representing certain spoken word or words, each test output in the first set of test outputs comprising a prediction of whether a respective test data entry of the set of test data entries comprises an audio signal corresponding to the certain spoken word or words;
comparing the first test outputs to the first labeled outputs representing the certain spoken word or words to determine a first number of true negative outputs (TN), a first number of true positive outputs (TP), a first number of false negative outputs (FN), and a first number of false positive outputs (FP);
defining a first number of correct test outputs (R) as the first number of TN plus the first number of TP;
defining a first number of incorrect test outputs (W) as the first number of the FN plus the first number of FP;
calculating, using a mathematical expression, a first performance score of the trained machine learning binary classifier that represents a level of accuracy of the trained machine learning binary classifier in predicting whether the test output comprises audio signals corresponding to the certain spoken word or words, the first performance score being calculated based on the first number of R, the first number of W, the first number of TN, and the first number of TP, the mathematical expression being (a scalar)/(a scalar plus a term directly proportional to the first number of R and inversely proportional to the first number of TN and the first number of TP);

evaluating performance of the trained machine learning binary classifier based on the calculated first performance score by determining that the calculated first performance score is smaller than a first predetermined number that indicates that the first number of incorrect test outputs is larger than a second predetermined number;

re-training the trained machine learning binary classifier with audio signal based training data having second labeled inputs and outputs representing certain spoken word or words by updating parameters of the trained machine learning binary classifier, the updating the parameters comprising changing one or more model parameters or one or more neural network weights of nodes; and repeating the determining, comparing, defining, and calculating steps for a second performance score of the trained machine learning binary classifier after the re-training, one or more times, by:

determining a second set of test outputs by inputting the set of test data entries into the re-trained machine learning binary classifier, each test output in the second set of test outputs comprising a prediction of whether the respective test data entry of the set of test data entries comprises an audio signal corresponding to the certain spoken word or words;

comparing the second test outputs to the second labeled outputs to determine a second number of TN, a second number of TP, a second number of FN, and a second number of FP;

defining a second number of R as the second number of TN plus the second number of TP;

defining a second number of W as the second number of FN plus the second number of FP; and calculating, using the mathematical expression, a second performance score of the re-trained machine learning binary classifier that represents a level of accuracy of the re-trained machine learning binary classifier in predicting whether the test output comprises audio signals corresponding to the certain spoken word or words, the second performance score being calculated based on the second number of R, the second number of W, the second number of TN, and the second number of TP.

10. The medium of claim 9, wherein the mathematical expression is a scalar divided by (the scalar plus (a term directly proportional to R and W; and inversely proportional to TN and TP)).

11. The medium of claim 9, wherein the mathematical expression is performance=$4/(4+((W \times R)/(TN \times TP)))$.

12. The medium of claim 9, further comprising:

creating the set of test data entries from an audio recording of the recorded telephone call; and determining the set of first labeled outputs by human observation or machine processing of the set of test data entries.

* * * * *